(12) United States Patent
Burley

(10) Patent No.: US 8,026,693 B2
(45) Date of Patent: Sep. 27, 2011

(54) INDUCTION CHARGER FOR PORTABLE BATTERY-POWERED DEVICES

(75) Inventor: Cameron D. Burley, Washington, DC (US)

(73) Assignee: Wi.U, LLC, Oak Hill, VA (US)

( * ) Notice: Subject to any disclaimer, the term of this patent is extended or adjusted under 35 U.S.C. 154(b) by 883 days.

(21) Appl. No.: 11/907,868

(22) Filed: Oct. 18, 2007

(65) Prior Publication Data

US 2009/0102416 A1    Apr. 23, 2009

(51) Int. Cl.
    *H02J 7/00*    (2006.01)
(52) U.S. Cl. .................. 320/108; 320/103; 320/107
(58) Field of Classification Search .............. 320/108
    See application file for complete search history.

(56) References Cited

U.S. PATENT DOCUMENTS

| | | | |
|---|---|---|---|
| 4,496,896 A * | 1/1985 | Melocik et al. ............ 320/108 |
| 5,952,814 A | 9/1999 | Van Lerberghe | |
| 6,043,626 A | 3/2000 | Snyder et al. | |
| 6,184,654 B1 | 2/2001 | Bachner et al. | |
| 6,191,553 B1 | 2/2001 | Feng-Jung | |
| 6,552,513 B1 | 4/2003 | Li | |
| 6,586,909 B1 | 7/2003 | Trepka | |
| 6,643,528 B1 | 11/2003 | Shim et al. | |
| 6,668,179 B2 | 12/2003 | Jiang | |
| 6,906,495 B2 | 6/2005 | Cheng et al. | |
| 7,020,500 B2 | 3/2006 | Saghbini | |
| 7,065,658 B1 | 6/2006 | Baraban et al. | |
| 7,166,987 B2 | 1/2007 | Lee et al. | |
| 7,212,842 B1 | 5/2007 | Seymour | |
| 2003/0218445 A1 | 11/2003 | Behar | |
| 2005/0007067 A1 * | 1/2005 | Baarman et al. .......... 320/108 |
| 2005/0116684 A1 | 6/2005 | Kim | |
| 2005/0127866 A1 * | 6/2005 | Hamilton et al. ......... 320/108 |
| 2005/0189910 A1 | 9/2005 | Hui | |
| 2005/0231159 A1 | 10/2005 | Jones et al. | |
| 2006/0061326 A1 * | 3/2006 | Vine et al. ................. 320/108 |
| 2006/0145659 A1 | 7/2006 | Patino et al. | |
| 2006/0202665 A1 | 9/2006 | Hsu | |
| 2006/0226805 A1 * | 10/2006 | Yu .......................... 320/107 |
| 2007/0117596 A1 | 5/2007 | Greene et al. | |

(Continued)

FOREIGN PATENT DOCUMENTS

FR    2885272    11/2006

(Continued)

OTHER PUBLICATIONS

LG Holster Battery Charger. Product Description from 1-800mobiles.com, 2007.

(Continued)

*Primary Examiner* — Edward Tso
*Assistant Examiner* — Johali A Torres Ruiz
(74) *Attorney, Agent, or Firm* — McKenna Long & Aldridge LLP (57) ABSTRACT

A charging apparatus for a portable battery-powered device, including one or more of the following: a receiver that inserts into a charging jack of the portable battery-powered device, an outer casing that removably receives the portable battery-powered device and the receiver, and a battery cell contained within the outer casing that inductively charges the portable battery-powered device through the receiver. In various exemplary embodiments, the charging apparatus includes a charging base that inductively charges the battery cell when the outer casing is placed upon the charging base.

2 Claims, 6 Drawing Sheets

U.S. PATENT DOCUMENTS

2007/0232877 A1 10/2007 He

FOREIGN PATENT DOCUMENTS

| GB | 2412020 | 9/2005 |
|---|---|---|
| JP | 2003/219569 | 7/2003 |
| KR | 2005/0019659 | 3/2005 |
| WO | WO 2007035103 | 3/2007 |

OTHER PUBLICATIONS (by Arik Hesseldahl) "Powermat Cuts the Cord." Financial News, 2007.

Samsung A900 Holster and Charger. Product Description from 1-800mobiles.com, 2007.

* cited by examiner

INDUCTION CHARGER FOR PORTABLE BATTERY-POWERED DEVICES

BACKGROUND OF THE INVENTION

1. Field of the Invention

This invention relates generally to powering a portable device.

2. Description of Related Art

Portable battery-powered devices are ubiquitous in modern society. Many people depend on the convenience provided by portable devices in their personal and professional lives. What the user of a battery-powered device gains in portability, however, the user sacrifices in reliability. Given the limited battery life of portable devices, to ensure continued use of the device, a user must closely and regularly monitor the battery level of the device or carry a charger on his or her person. Moreover, when the user desires to recharge the battery, he or she must find a source of power. This is not possible in some circumstances. Thus, there is a need for a portable charging apparatus that charges a battery-powered device.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a charger for portable battery-powered devices overcoming one or more of the problems described herein, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

One embodiment is a device charger that plugs into a cigarette lighter socket, thereby eliminating the need for a land utility source. This embodiment, however, requires the user to carry an often bulky charging device on his or her person. Moreover, if the user cannot access a cigarette lighter socket, this embodiment would be inadequate. For example, if a user were vacationing abroad, camping or mountain climbing in a remote area, or traveling in an airplane, he or she would likely be unable to access a compatible power source.

Another embodiment for charging of portable devices constitutes a pad that charges the battery via electromagnetic induction. While these charging devices eliminate the need to plug the portable device into the charging device, they suffer from deficiencies similar to those of other embodiments. In order to charge the portable device, the charging pad itself must be plugged into a power source.

Moreover, in some embodiments, the user must monitor the battery level of the portable device to know when the device needs recharging. When the user determines that the device needs to be charged, he or she must take active steps to plug in the device or place the device on a charging pad.

Accordingly, there is a need for a charging apparatus for portable battery-powered devices that is capable of charging the portable devices even when the user does not have access to a power source. Moreover, there is a need for a charging apparatus that requires no active monitoring of the power level of the portable device by automatically charging the device before the battery is depleted.

According to the foregoing, various embodiments provide an improved wireless induction charger incorporated into a portable battery-powered device's case, holder, or receptacle. For example, the device's case may be fitted with a high capacity battery cell and a coil-filled pad that creates an electromagnetic field. In such embodiments, a receiver plugged into the charging jack of the battery-powered device intercepts the radiating electromagnetic waves, thereby charging the battery-powered device.

In various exemplary embodiments, the portable device is powered by another secondary power source, such as a fuel cell, hydrogen cell, or other suitable form of portable power. Thus, any reference to a battery herein should be understood to include not only a battery, but also other forms of rechargeable secondary power sources, whether known or developed in the future.

In some embodiments, the receiver is fitted with a voltage reader to calculate the portable device's battery power. In these embodiments, when the voltage reader detects the battery has fallen below or increased above a specified range, the receiver's transmitter pings the charger's transmitter, which then signals the charger to begin or stop charging.

Various exemplary embodiments are a charging apparatus for a portable battery-powered device, including one or more of the following: a receiver that inserts into a charging jack of the portable battery-powered device, an outer casing that removably receives the portable battery-powered device and the receiver, and a battery cell contained within the outer casing that inductively charges the portable battery-powered device through the receiver.

In various exemplary embodiments, the receiver monitors the current power level of the portable battery-powered device and the battery cell automatically charges the portable battery-powered device when the current power level is less than or equal to a predetermined value.

In various exemplary embodiments, the charging apparatus includes an activation mechanism and the battery cell charges the portable battery-powered device in response to a user actuating the activation mechanism.

In various exemplary embodiments, the charging apparatus includes an opposite activation mechanism and the charging apparatus activates a variable inductor in response to a user actuating the opposite activation mechanism.

In various exemplary embodiments, the battery cell inductively charges the portable battery-powered device by generating an electromagnetic field using DC-to-DC pulse conversion over a preset frequency.

Various exemplary embodiments include a display screen. In various exemplary embodiments, the display screen displays at least one of the amount of time and the percentage remaining in the life of the battery cell. In various exemplary embodiments, the display screen changes color to indicate that the battery cell is charging the portable battery-powered device. In various exemplary embodiments, the display screen displays a message indicating that the battery cell needs to be recharged when the charge remaining in the battery cell falls below a predetermined value.

In various exemplary embodiments, the portable-battery powered device is a cellular telephone.

In various exemplary embodiments, a front portion of the outer casing includes a flexible material and a back portion of the outer casing includes a hard material.

Various exemplary embodiments are a method of charging a portable battery-powered device including one or more of the following: connecting a receiver to a charging jack of the portable battery-powered device, inserting the portable battery-powered device into an outer casing of a charging apparatus, and inductively charging the portable battery-powered device through a battery cell contained within the outer casing.

Various exemplary embodiments include monitoring a current power level of the portable battery-powered device and automatically charging the portable battery-powered device when the current power level is less than or equal to a predetermined value.

Various exemplary embodiments charge the portable battery-powered device when a user actuates an activation mechanism on the charging apparatus.

Various exemplary embodiments include an opposite activation mechanism. In these embodiments, the charging apparatus activates a variable inductor in response to a user actuating the opposite activation mechanism.

In various exemplary embodiments, the charging step inductively charges the portable battery-powered device by generating an electromagnetic field using DC-to-DC pulse conversion over a preset frequency.

In various exemplary embodiments, the charging apparatus includes a display screen.

In various exemplary embodiments, the portable battery-powered device is a cellular telephone.

Various exemplary embodiments are a charging apparatus for a portable battery-powered device, including one or more of the following: a receiver that inserts into a charging jack of the portable battery-powered device, an outer casing that removably receives the portable battery-powered device and the receiver, a battery cell contained within the outer casing that inductively charges the portable battery-powered device through the receiver, and a charging base that inductively charges the battery cell when the outer casing is placed upon the charging base.

In various exemplary embodiments, the charging base inductively charges the battery cell through a variable inductor in the charging apparatus and the variable inductor is activated in response to a user actuating an opposite activation mechanism on the charging apparatus.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
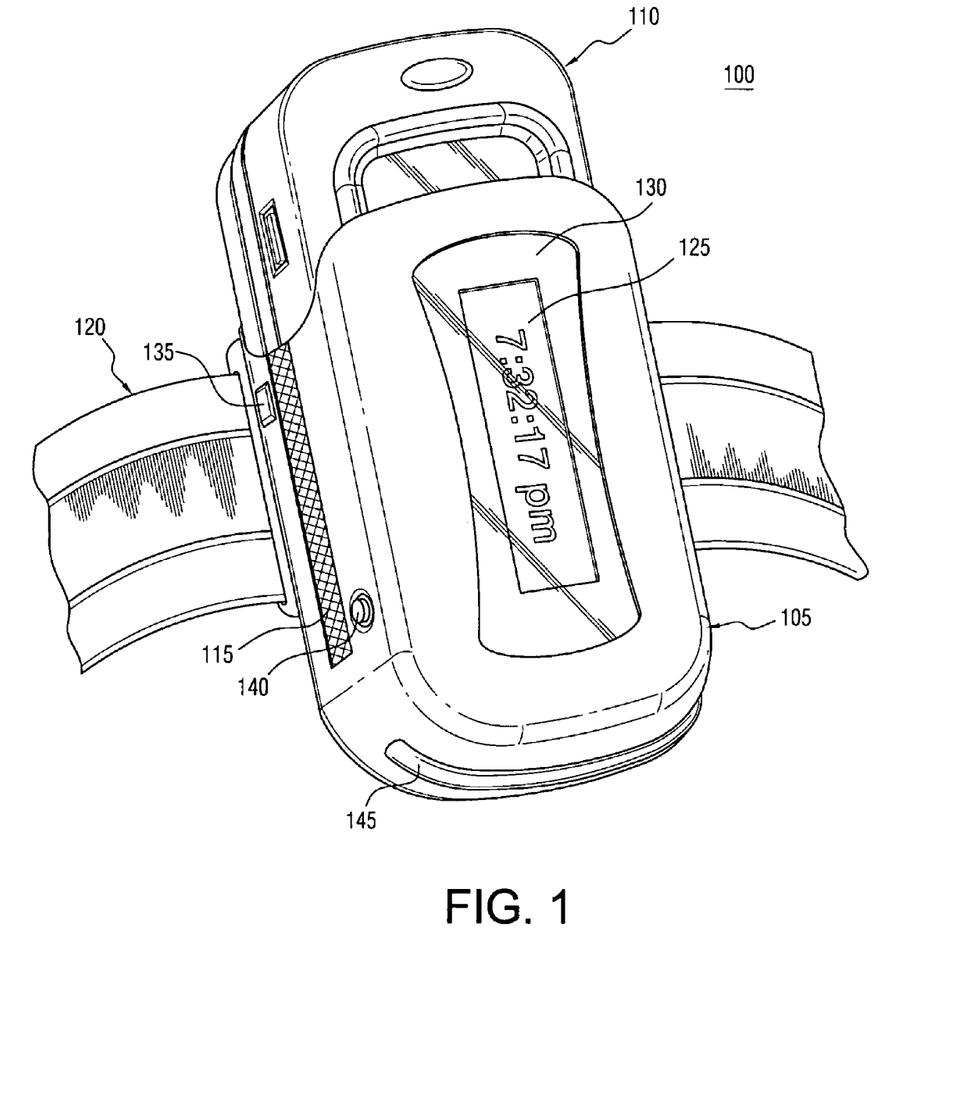
FIG. 1 shows a perspective view of an exemplary embodiment of a charging apparatus, including a portable battery-powered device.

Referring now to the drawings, in which like numerals refer to like components or steps, there are disclosed broad aspects of various exemplary embodiments. FIG. 1 is a perspective view of an exemplary embodiment of a charging apparatus 100, including a portable battery-powered device 105.

The charging apparatus 100 includes an outer casing 105, which is capable of removably receiving a portable battery-powered device 110. In various exemplary embodiments, the outer casing 105 is constructed of a combination of neoprene, rubber, and vinyl, which stretches to accept the portable battery-powered device 110 and contracts to hold the device 110 secure in the outer casing 105. Elastic band 115 enables further flexibility, allowing the outer casing 105 to accept devices of widely varying sizes and shapes. In alternative embodiments, the outer casing 105 includes another flexible material, hard plastic, and other suitable replacements known to those of skill in the art. Moreover, in various exemplary embodiments, the front of outer casing 105 includes a flexible material to accommodate devices of varying sizes, while the back of the outer casing 105 constitutes a hard material to protect the device.

As depicted in FIG. 1, the portable battery-powered device 110 is a cellular telephone. It should be noted that although various embodiments herein are described in connection with a cellular telephone, these embodiments are merely illustrative of a multitude of embodiments. In various alternative embodiments, the portable battery-powered device 105 is a personal digital assistant (PDA), a wireless email device, a portable MP3, DVD, or CD player, a power tool, a laptop computer, or any other portable device powered at least in part by one or more rechargeable batteries. In various exemplary embodiments, the portable battery-powered device 105 is a means of locomotion including, but not limited to, a golf cart, a go-cart, a scooter, an off-road vehicle, a Gator™, a Segway®, and a Power Wheels® toy.

In various exemplary embodiments, the charging apparatus 100 includes a wrist band 120 composed of a flexible material, thereby enabling the user to secure the charging apparatus 100 to his or her wrist or arm. Alternatively, in various exemplary embodiments, the wrist band 120 is replaced by a clip that can be secured to the user's waistband, belt, or some other article of clothing.

In various exemplary embodiments, in order to provide feedback to the user, the charging apparatus includes an LCD screen 125 or some other type of display. In some embodiments, the LCD screen 125 displays the amount of time remaining in the life of the battery cell (not shown) inside of the charging apparatus 100. For example, the LCD screen 125 could display, "9 days, 3 hrs, 42 mins" to indicate the remaining life of the battery cell.

In various exemplary embodiments, in addition to or instead of the remaining time, the LCD screen 125 displays the percentage of battery life remaining or the current time. In some embodiments, the LCD screen 125 changes color to indicate that the charging apparatus 100 is currently charging the portable battery-powered device 110 or that the charging apparatus 100 is close to depleted.

In some embodiments, the LCD screen 125 displays a warning message notifying the user when the charging apparatus 100 needs to be recharged using the charging base (not shown). In various exemplary embodiments, an acrylic plastic overlay 130 is included to protect the LCD screen 125 by preventing scratches and cracks. In some embodiments, a backlight button 135 allows the user to toggle the LCD backlight 175 on and off, thereby regulating the amount of battery cell consumed by the LCD backlight 175.

In various exemplary embodiments, manual activation button 140 enables the user to manually cause the battery cell (not shown) to begin charging the portable battery-powered device 110. The manual activation button 140 thereby bypasses the automatic charging of the battery powered-device 110 as described further herein. In alternative embodiments, the manual activation button 140 constitutes a switch, lever, or other input mechanism.

In various exemplary embodiments, device-connected indicator 145 is included to indicate to the user whether a battery-powered device 110 is currently connected to the charging apparatus 145. For example, the device-connected indicator 145 includes an LED or other type of light that turns on when the device 110 has made a proper connection with the charging apparatus 105.

Figure 2:
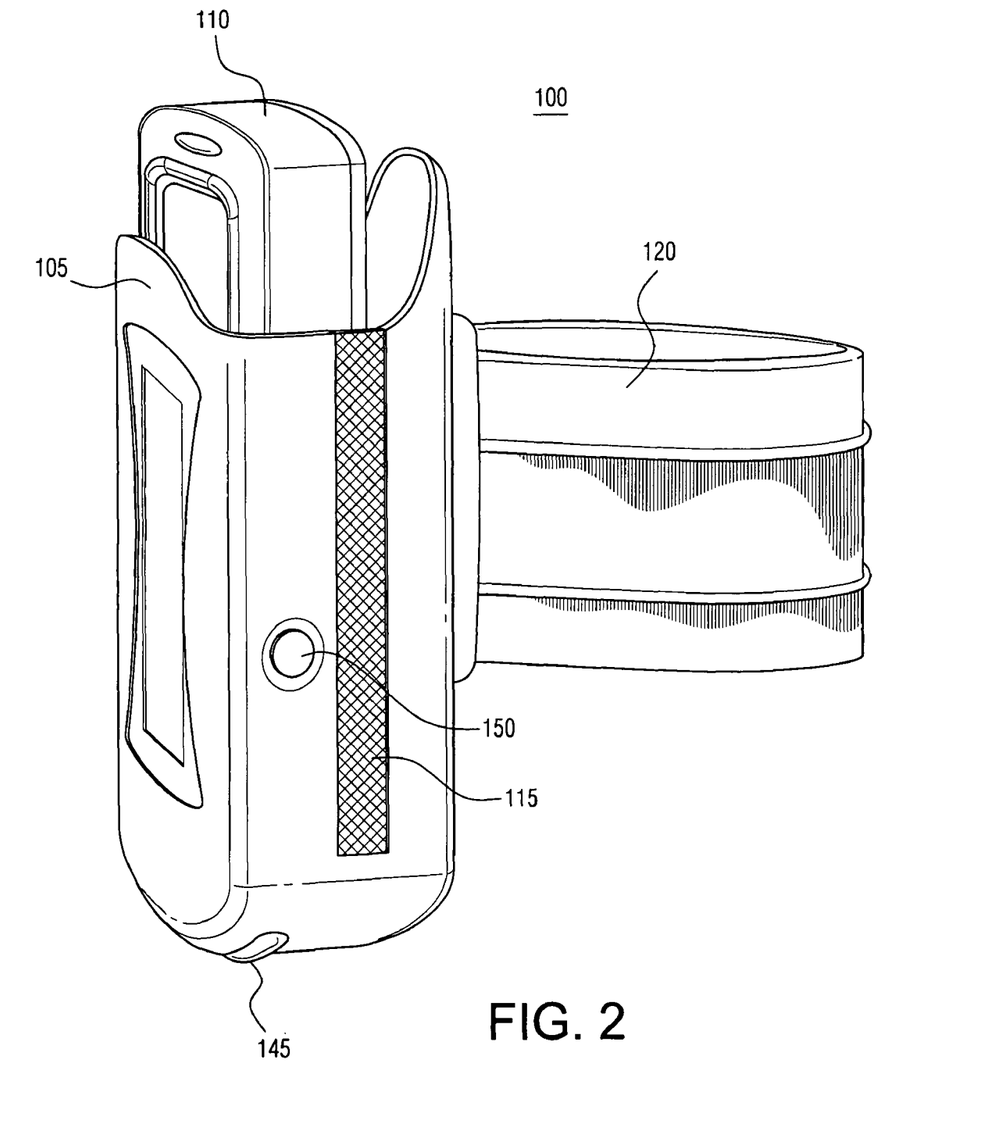
FIG. 2 shows a right side view of an exemplary embodiment of a charging apparatus, including a portable battery-powered device.

FIG. 2 is a right side view of an exemplary embodiment of a charging apparatus 105, including a portable battery-powered device 110. In various exemplary embodiments, charging apparatus 100 includes an opposite activation button 150. In various exemplary embodiments, when the user presses the opposite activation button 150, the charging apparatus 100 starts a variable inductor to charge from the home base (not shown). In alternative embodiments, the opposite activation button 150 constitutes a switch, lever, or other input mechanism.

Figure 3:
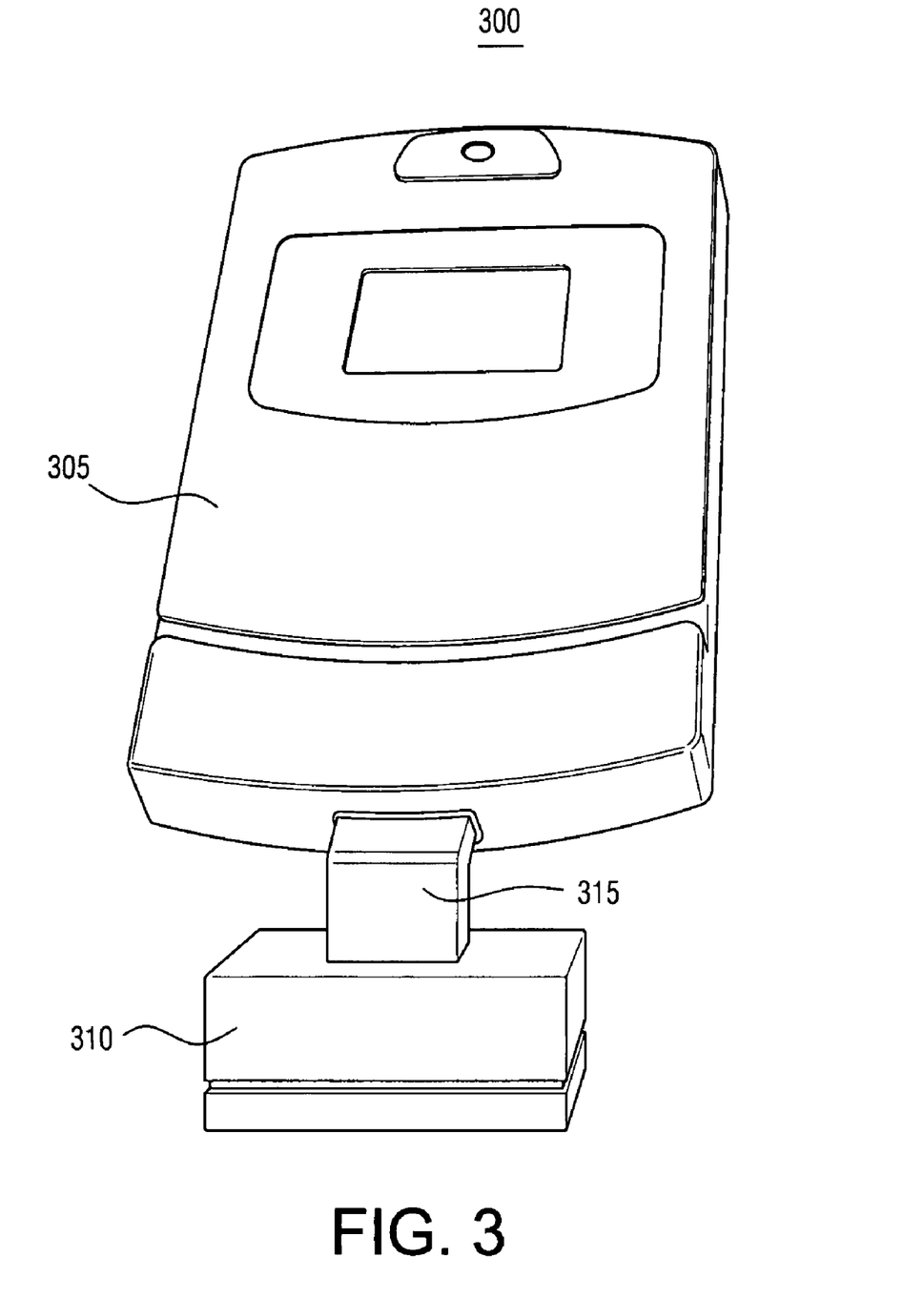
FIG. 3 shows a perspective view of an exemplary embodiment of a receiver-device assembly.

FIG. 3 is a perspective view of an exemplary embodiment of a receiver-device assembly 300. In various exemplary embodiments, receiver body 310 is attached to a receiver tip 315 sized to fit into the charging jack of portable battery-powered device 305. A different receiver tip 315 is used depending on the size and type of charging jack included in portable battery-powered device 305. In various exemplary embodiments, receiver body 310 includes a secondary coil and a transceiver used to send messages to the charging apparatus 100. The interaction of the components of receiver-device assembly 300 is described further below in connection with FIG. 6.

Figure 4:
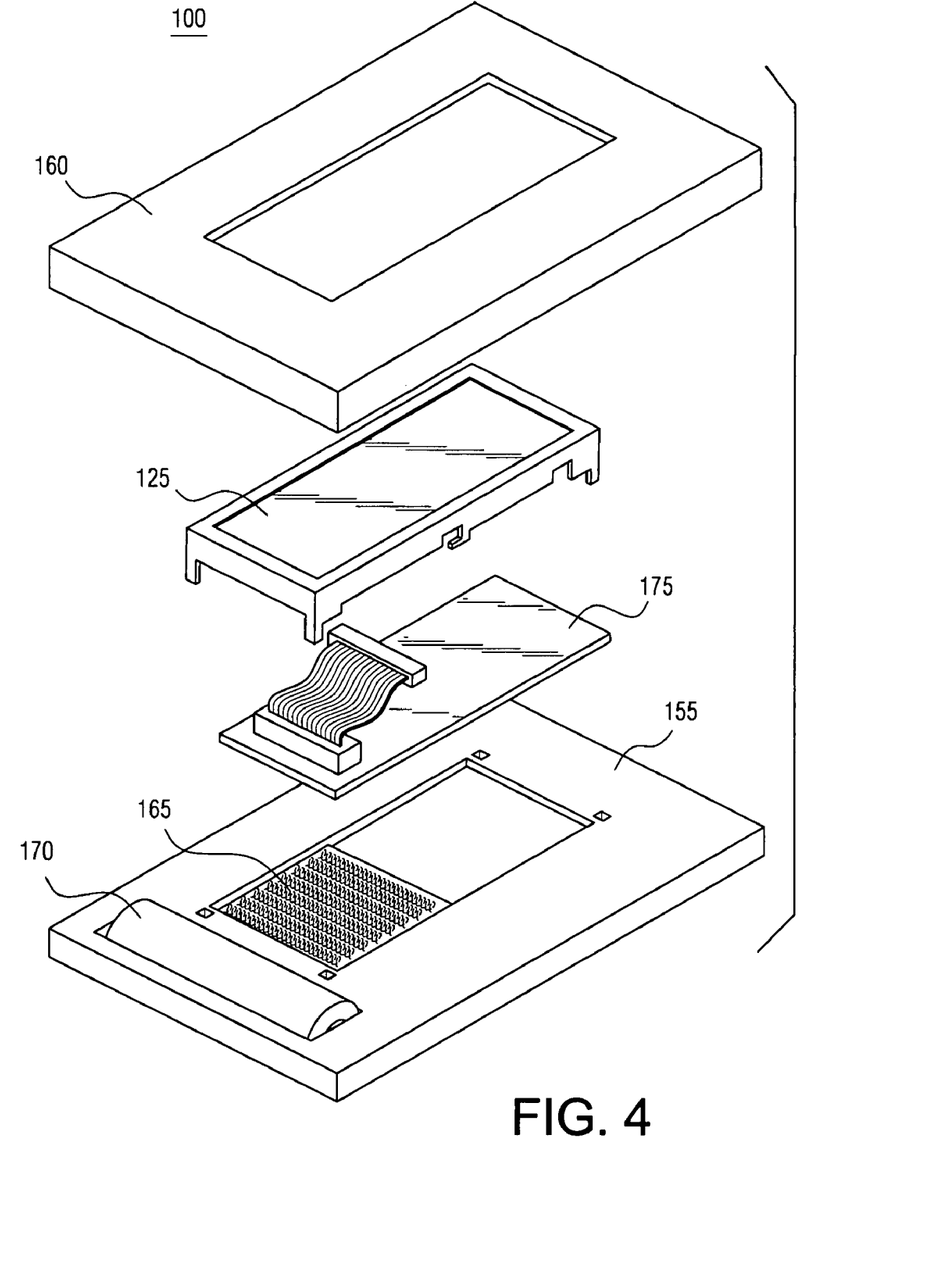
FIG. 4 shows an exploded perspective view of various internal components of an exemplary charging apparatus.

FIG. 4 is a perspective view of various internal components of an exemplary charging apparatus 100. In various exemplary embodiments, frame 155 supports the various internal components of the charging apparatus 100. In various exemplary embodiments, the front frame 160 includes a rectangular cut-out to house the LCD screen 125. In some embodiments, an electromagnetic pad 165 is located at the center of frame 155. In some embodiments, electromagnetic pad 165 is coil-filled and creates an electromagnetic field by drawing current from battery cell 170. In various exemplary embodiments, battery cell 170 fits above the electromagnetic pad 165 and supplies energy to the pad and the LCD backlight 175.

Figure 5:
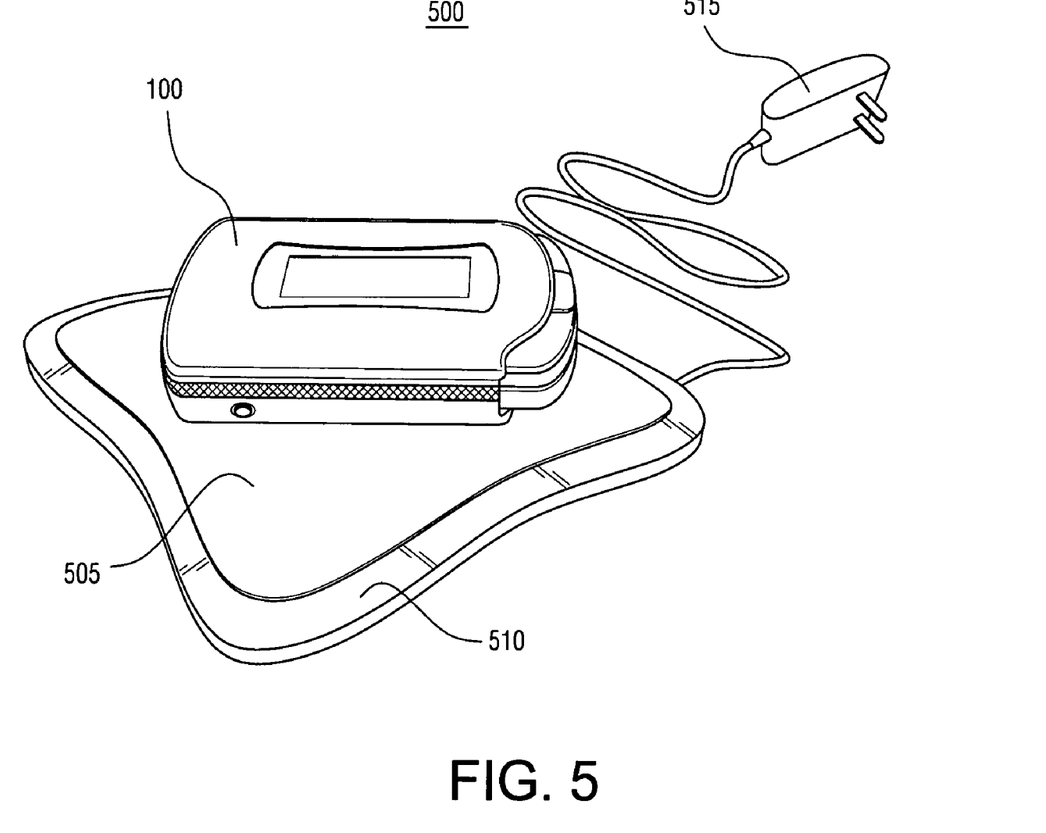
FIG. 5 shows a perspective view of an exemplary charger-base assembly.

FIG. 5 is a perspective view of an exemplary charger-base assembly 500. In various exemplary embodiments, charging base 505 wirelessly charges charging apparatus 100 using induction. In some embodiments, charging base 505 includes a primary coil, which wirelessly transmits energy drawn through charging base power adapter 515 to a secondary coil included in charging apparatus 100. In some embodiments, charging base 505 includes a charging indicator 510 which lights up to indicate that the charging apparatus 100 is currently being charged by the charging base 505.

In various exemplary embodiments, the charging base 505 is capable of inductively charging the charging apparatus 100, but is not capable of charging the portable battery-powered device 110, 305 directly. In some such embodiments, the primary coil of the charging base 505 is in tune with the secondary coil of the charging apparatus 100. In various exemplary embodiments, when the charging apparatus 100 is within a particular range of the charging base 505, the charging base 505 automatically detects when the charging apparatus 100 is low on power and begins to charge the charging apparatus 100.

Figure 6:
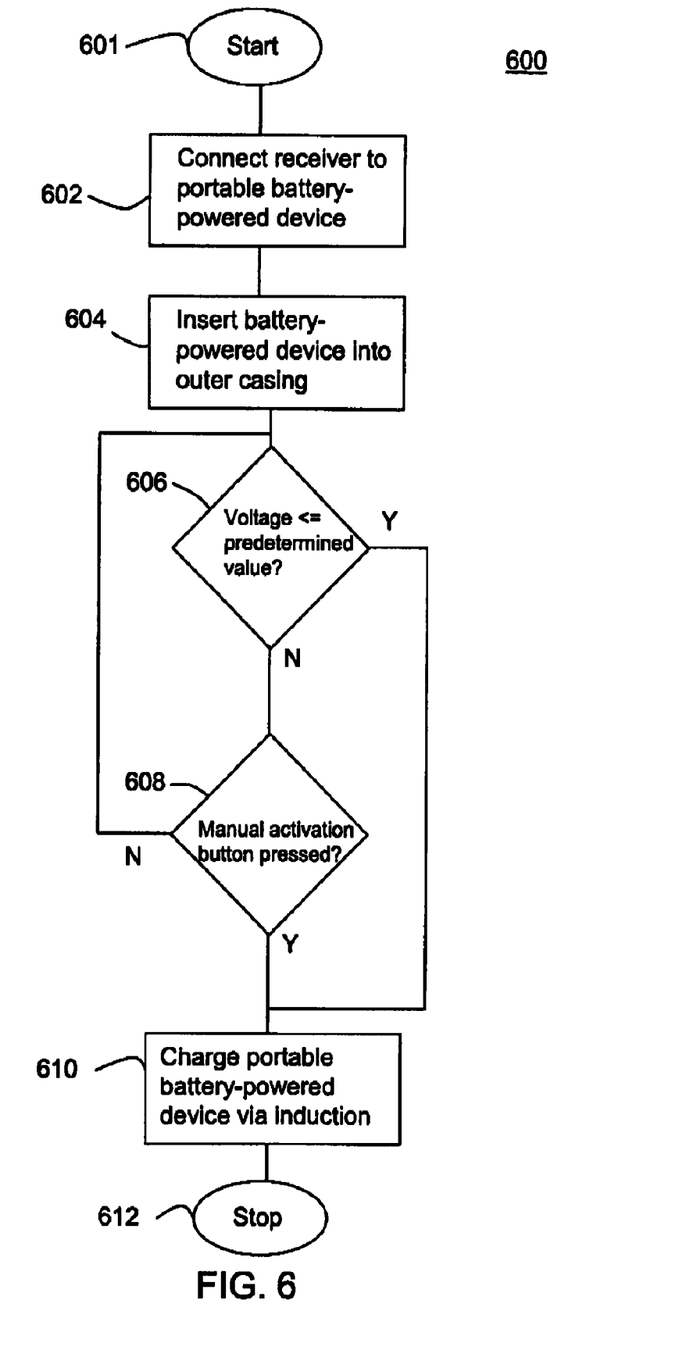
FIG. 6 is a schematic diagram of an exemplary embodiment of a method of charging a portable battery-powered device using a charging apparatus.

FIG. 6 is a schematic diagram of an exemplary embodiment of a method of charging a portable battery-powered device 110, 305 using a charging apparatus 100. Exemplary method 600 starts in step 601 and proceeds to step 602, where the user connects the receiver tip 315 to the charging jack of the portable battery-powered device 110, 305. Exemplary method 600 then proceeds to step 604.

In step 604, the user inserts the receiver-device assembly 300 into the outer casing 105 of the charging apparatus 100. In various exemplary embodiments, when the receiver-device assembly 300 is properly inserted into the outer casing 105, the receiver body 310 begins automatic monitoring of the power level of the portable battery-powered device 110, 305. In various exemplary embodiments, the receiver body 310 receives a voltage reading through the receiver tip 315 indicating the current power level of the portable battery-powered device 110, 305.

Following completion of step 604, exemplary method 600 proceeds to step 606. In step 606, the receiver body 310 compares this value with a predetermined voltage minimum to determine whether to initiate charging.

Exemplary method 600 then proceeds to step 608. In various exemplary embodiments, the user initiates charging by pressing the manual activation button 140. Thus, in various exemplary embodiments, in step 608, the charging apparatus 100 determines whether the manual activation button 140 has been pressed. Although exemplary method 600 includes both step 606 and step 608, various exemplary embodiments include only one of step 606 and step 608.

In various exemplary embodiments, when the receiver body 310 determines that the current voltage of the portable battery-powered device 110, 305 is less than or equal to the predetermined minimum in step 606, exemplary method 600 proceeds to step 610 where charging is initiated. In various exemplary embodiments, when the charging apparatus 100 determines that the user has pressed the manual activation button 140 in step 608, exemplary method 600 proceeds to step 610 where charging is initiated.

When, in step 606, a determination is made that the current voltage of the portable battery-powered device 110, 305 is less than or equal to a predetermined voltage, in various exemplary embodiments, the transmitter of receiver body 310 pings the charging apparatus 100 to activate the battery cell 170. When, in step 608, a determination is made that the manual activation button is pressed, in various exemplary embodiments, the charging apparatus activates the battery cell 170 without first receiving an instruction from receiver body 310.

In various exemplary embodiments, charging step 610 charges the portable battery-powered device 110, 305 using the following steps. Upon initiation of the battery cell 170, the electromagnetic pad or primary coil 165 in charging apparatus 100 receives current and generates an electromagnetic field at a set frequency. A secondary coil in receiver body 310 receives the current through the use of a secondary coil set to the same frequency and transfers the power to portable battery-powered device 110, 305. Throughout the charging process, in various exemplary embodiments, a transmitter in receiver body 310 continuously reads the current voltage of the portable battery-powered device 110, 305. When the current voltage reaches a predetermined maximum value, the transmitter in receiver body 310 generates a message to deactivate the battery cell 170 and end the charging process.

In various exemplary embodiments, the battery cell 170 constitutes a lithium-ion battery, which outputs direct current (DC). The charging apparatus 100 generates the electromagnetic field using DC-to-DC pulse conversion over the preset frequency, thereby eliminating the need for a power inverter.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A charging apparatus for a portable battery-powered device, comprising:
   a receiver that inserts into a charging jack of the portable battery-powered device;
   an outer casing that removably receives the portable battery-powered device and the receiver;
   a battery cell contained within the outer casing that inductively charges the portable battery-powered device through the receiver; and
   a charging base that inductively charges the battery cell when the outer casing is placed upon the charging base.

2. The method according to claim 1, wherein the charging base inductively charges the battery cell through a variable inductor in the charging apparatus, the variable inductor activated in response to a user actuating an opposite activation mechanism on the charging apparatus.

\* \* \* \* \*